(12) United States Patent
Steinberg et al.

(10) Patent No.: US 7,290,321 B2
(45) Date of Patent: Nov. 6, 2007

(54) ALIGNMENT APPARATUS AND METHOD FOR ALIGNING STACKED DEVICES

(75) Inventors: Dan A. Steinberg, Blacksburg, VA (US); Mindaugas F. Dautartas, Blacksburg, VA (US); Jasean Rasnake, Blacksburg, VA (US)

(73) Assignee: Shipley Company, L.L.C., Marlborough, MA (US)

( * ) Notice: Subject to any disclaimer, the term of this patent is extended or adjusted under 35 U.S.C. 154(b) by 0 days.

(21) Appl. No.: 11/500,061

(22) Filed: Aug. 7, 2006

(65) Prior Publication Data

US 2006/0272149 A1   Dec. 7, 2006

Related U.S. Application Data

(62) Division of application No. 09/923,842, filed on Aug. 7, 2001, now Pat. No. 7,086,134.

(60) Provisional application No. 60/223,163, filed on Aug. 7, 2000.

(51) Int. Cl.
    *B23Q 3/00*   (2006.01)

(52) U.S. Cl. ............... 29/464; 29/834; 228/180.22; 385/52

(58) Field of Classification Search .......... 29/834, 29/759, 464, 407.1, 271; 385/52; 228/180.22; 257/282, 283, 332, 797
    See application file for complete search history.

(56) References Cited

U.S. PATENT DOCUMENTS

| | | |
|---|---|---|
| 4,558,812 A | 12/1985 | Bailey et al. |
| 4,689,291 A | 8/1987 | Popovic et al. |
| 4,728,787 A | 3/1988 | Henry et al. |
| 4,752,816 A | 6/1988 | Sussman et al. |
| 4,755,017 A | 7/1988 | Kapany |
| 4,835,078 A | 5/1989 | Harvey et al. |
| 4,875,750 A | 10/1989 | Spaeth et al. |
| 4,895,615 A | 1/1990 | Muschke |
| 5,044,711 A | 9/1991 | Saito |
| 5,135,590 A | 8/1992 | Basavanhally et al. |
| 5,178,723 A | 1/1993 | Nguyen |
| 5,179,609 A | 1/1993 | Blonder et al. |
| 5,252,294 A | 10/1993 | Kroy et al. |
| 5,257,332 A | 10/1993 | Pimpinella |
| 5,257,336 A | 10/1993 | Dautartas |
| 5,259,054 A | 11/1993 | Benzoni et al. |
| 5,281,301 A | 1/1994 | Basavanhally |
| 5,337,398 A | 8/1994 | Benzoni et al. |
| 5,346,583 A | 9/1994 | Basavanhally |
| 5,357,590 A | 10/1994 | Auracher |
| 5,412,748 A | 5/1995 | Furuyama et al. |
| 5,466,815 A | 11/1995 | Enhsen et al. |
| 5,500,910 A | 3/1996 | Boudreau et al. |

(Continued)

*Primary Examiner*—David P. Bryant
*Assistant Examiner*—Alexander P Taousakis
(74) *Attorney, Agent, or Firm*—Jonathan D. Baskin

(57) ABSTRACT

An apparatus for passively aligning first and second substrates having micro-components disposed thereon when the substrates do not include patterned surfaces which face each other. The apparatus includes a first depression which cooperates with an alignment sphere to mechanically engage a corresponding depression disposed on the front surface of the first substrate and a second depression which cooperates with a second alignment sphere to mechanically engage a corresponding depression disposed on the front surface of the second substrate. The first and second depression of the alignment apparatus and the alignment spheres cooperate to passively align micro-components disposed on each of the substrates.

3 Claims, 10 Drawing Sheets

U.S. PATENT DOCUMENTS

| | | |
|---|---|---|
| 5,546,209 A | 8/1996 | Willner et al. |
| 5,550,088 A | 8/1996 | Dautartas et al. |
| 5,568,892 A | 10/1996 | Basavanhally |
| 5,613,024 A | 3/1997 | Shahid |
| 5,700,987 A | 12/1997 | Basavanhally |
| 5,748,827 A | 5/1998 | Holl et al. |
| 5,841,544 A | 11/1998 | Dautartas et al. |
| 5,871,888 A | 2/1999 | Heremans et al. |
| 5,949,137 A * | 9/1999 | Domadia et al. ............ 257/712 |
| 5,964,397 A | 10/1999 | Dautartas |
| 5,999,295 A | 12/1999 | Vowell et al. |
| 6,041,071 A | 3/2000 | Tayebati |
| 6,095,697 A | 8/2000 | Lehman et al. |
| 6,118,917 A | 9/2000 | Lee et al. |
| 6,136,411 A | 10/2000 | Dautartas |
| 6,236,788 B1 | 5/2001 | Moisel |
| 6,249,627 B1 | 6/2001 | Bond et al. |
| 6,265,240 B1 | 7/2001 | Dautartas et al. |
| 6,270,263 B1 | 8/2001 | Iwase et al. |
| 6,320,997 B1 | 11/2001 | Dautartas et al. |
| 6,394,666 B1 | 5/2002 | Minamino et al. |
| 6,408,120 B1 | 6/2002 | Dautartas |
| 6,477,303 B1 | 11/2002 | Witherspoon |
| 6,546,173 B2 | 4/2003 | Case et al. |
| 6,595,700 B2 | 7/2003 | Steinberg et al. |
| 6,665,487 B2 | 12/2003 | Wang |
| 6,721,479 B2 | 4/2004 | Lasecki et al. |
| 6,793,409 B2 | 9/2004 | Wickman et al. |
| 6,826,324 B2 | 11/2004 | Steinberg et al. |
| 6,838,689 B1 | 1/2005 | Deng et al. |
| 6,884,650 B2 * | 4/2005 | Lee et al. ..................... 438/51 |
| 2002/0196997 A1 | 12/2002 | Chakrovorty et al. |

\* cited by examiner

ALIGNMENT APPARATUS AND METHOD FOR ALIGNING STACKED DEVICES

CROSS-REFERENCE TO RELATED APPLICATIONS

This application is a divisional of U.S. application Ser. No. 09/923,842, filed on Aug. 7, 2001 now U.S. Pat. No. 7,086,134, therethrough claiming priority to U.S. Provisional Application Ser. No. 60/223,163, filed on Aug. 7, 2000, the entire contents of which applications are hereby incorporated by reference herein.

BACKGROUND

1. Technical Field

The present disclosure relates generally to micromachined devices and methods of assembly the same. More particularly, the present disclosure relates to structures and methods for precisely aligning substrates (and the micro-components disposed thereon) which lack complimentary interfacing/inter-engaging surfaces or features.

2. Background of Related Art

Many manufacturing techniques rely on precise alignment techniques to ensure accurate inter-working relationships and/or proper inter-working connections among the various components of the finished product. As can be appreciated, even the slightest aberration or misalignment between two inter-working components can render the end product virtually unusable for its intended purpose.

Modern trends towards miniaturization and other advancements in telecommunications, microelectronics, micro-mechanics and fiber optics have made alignment tasks more daunting by requiring highly precise alignment of the various micro-components disposed thereon, e.g., micro-electronic and micro-optic components such as transistors, wires, lenses, fiber optic cable arrays, etc. For example, integrated circuit chips must be aligned with respect to circuit boards so that they may be soldered or otherwise connected to an electrically conducting pattern on the circuit board. Moreover, optical fibers and micro-lenses must be precisely aligned with respect to each other (or with respect to a light source) so that light may be effectively transferred through the optical fibers or lenses.

As can be appreciated, a number of techniques have been developed to position two or more components relative to one another on a substrate (silicon chip). One such technique simply involves placing one component atop the other component and subsequently aligning the two components on the chip. Once the components are properly aligned, they are permanently attached to the substrate by a known method of attachment, e.g., adhesives or solder bumps. Generally, this technique is limited to uses where relatively imprecise alignment is acceptable.

Other advances in technology have greatly improved alignment accuracy among micro-electronic and/or micro-optic components, e.g., photolithographic or etching techniques. These techniques are particularly suited for self-alignment or so-called "passive" alignment of various micro-machined components and devices. See, for example, U.S. Pat. Nos. 4,558,812 and 5,178,723 for descriptions of known self-alignment techniques.

For example, a number of assemblies which utilize a single crystal semiconductor material, e.g., silicon, as the support structure for the various optical devices are known in the optics industry. This is often called "silicon optical bench" technology. Silicon processing technology has been developed to the stage where a number of relatively simple procedures, e.g., oxidation, isotropic or anisotropic etching, may be utilized to facilitate attachment of the various optical lenses and optical fibers to the support member as well as provide precise alignment therebetween. Additionally, it is possible to form optical waveguiding structures directly in or on a silicon substrate thereby resulting in the ability to form a completely operable optical subassembly in silicon.

Passive or self-alignment of microelectronic, micro-mechanic or micro-optic components on substrates which have complimentary or interengaging surfaces on opposing surfaces (i.e., frontside to frontside surfaces) has proven to be relatively simplistic. For example, a series of alignment spheres (e.g., ball lenses) can be interposed between two micro-etched channels disposed on (or within) respective substrates. More particularly and as best illustrated by way of example in FIG. 1, aligning two silicon chips 20 and 30 which include opposing patterned surfaces, i.e., facing surfaces or so-called "frontside to frontside" opposing features, is relatively simplistic. For example, one or more alignment spheres 40, e.g., ball lenses, may be interdisposed between complimentary pits, grooves, cavities or patterns 22 and 32 which are micromachined, e.g., anistropically etched, within each corresponding substrate's 20, 30 surface. Each lens self-aligns (self-centers) within a respective channel according to pre-determined tolerances which, in turn, accurately aligns the two substrates 20 and 30 (and the respective micro-components disposed thereon) relative to one another (See FIG. 1 wherein the ball lenses 40 accurately align the stacked chips 20 and 30 relative to each other for subsequent bonding).

FIG. 2 illustrates the inherent frustrations associated with precisely aligning microelectronic, micro-mechanic and micro-optic components on substrates which do not have opposing surfaces, i.e., so called "frontside to backside" alignment. As can be appreciated, aligning the micro-lenses 50 on substrate 20 with the grooves 32 of substrate 30 requires backside alignment on the lens substrate 20. Typically, alignment tolerances for corresponding micro-mechanical, microelectrical and micro-optical components are on the order of about 1 micron (or better) for achieving optimum communication between components.

Thus, a need exists to develop relatively inexpensive and reliable structures and methods which precisely align microelectronic, micro-mechanical and micro-optical components disposed on one or substrates which do not include mechanically-patterned or mechanically inter-engagable opposing surfaces.

SUMMARY

The present disclosure relates to an apparatus for passively aligning first and second substrates each having micro-components (e.g., micro-optics, micro-electronic elements and/or micro-mechanical elements) disposed thereon when the substrates do not include patterned surfaces which oppose, i.e., "face", one another. More particularly, the present disclosure relates to an apparatus for aligning a first substrate having at least one micro-component disposed thereon relative to a second substrate having at least one micro-component disposed thereon. Each of the substrates includes a front surface oriented in the same direction. The first substrate is disposed between the alignment apparatus and the second substrate and the second substrate includes a periphery which extends beyond the first substrate. The second substrates also includes at least one depression on the front surface which is disposed within the periphery of the second substrate.

The apparatus includes a first depression which mechanically engages one end of a first alignment element. The first alignment element has an opposite end which engages a depression disposed on the front surface of the first substrate. The apparatus also includes at least one second depression which mechanically engages one end of a second alignment element. The second alignment element has an opposite end which engages a depression disposed on the front surface of the second substrate. The first and second depressions and the alignment elements cooperate to passively align micro-components disposed on each of the substrates.

In one embodiment, a notch or groove cooperates with an alignment element (ball sphere) to mechanically engage a corresponding notch or groove disposed on the front facing surface of the first substrate. The alignment element may be spherical, cylindrical and/or polygonal depending upon a particular purpose.

In another embodiment, the groove associated with the alignment member and the corresponding groove on the first substrate are dimensioned for partial reception of the ball sphere. The alignment element may also be dimensioned to create a gap between the first and second substrates when assembled depending upon a particular purpose or to achieve a particular result.

In one embodiment, the alignment member is polygonally-shaped such that the interfaces are associated with the outer surfaces of the alignment member and include angles which mechanically compliment corresponding angles associated with the interfaces of the first substrate and the second substrate. The alignment member may be pyramidally-shaped to include an apex which partially projects beyond a back surface of the first substrate to mechanically engage a corresponding interface associated with the front surface the second substrate.

The corresponding interfaces of the first and/or second substrate may also include pyramidally-shaped recesses or V-shaped grooves which mechanically engage the interfaces associated with the alignment member (and/or the alignment spheres mentioned above acting in cooperation with the alignment member) to align the substrates.

The present disclosure also relates to a micro-chip assembly which includes first and second alignment elements and first and second substrates. The first substrate has a front surface which faces a first direction and includes at least one micro-component disposed thereon. The front surface also includes at least one depression for mechanically engaging one end of the first alignment element. The second substrate also includes a front surface which faces the first direction and at least one micro-component disposed thereon. At least one depression is disposed within the front surface of the second substrate for mechanically engaging one end of the second alignment element. The periphery of the second substrate extends beyond the periphery of the first substrate.

The microchip assembly also includes a third substrate which has first and second depressions disposed thereon for engaging the opposite ends of the first and second alignment elements for passively aligning the first and second substrates. Preferably, the first substrate is disposed between the second substrate and the third substrate.

In another embodiment of the micro-chip assembly at least one of the depressions of the first substrate, the second substrate and/or the third substrate is defined between two raised surfaces.

Another embodiment of the present disclosure includes a micro-chip assembly having first and second alignment elements and first and second substrates. Each of the substrates has a front surface which faces the same direction and each front surface includes at least one micro-component disposed thereon and at least one depression for mechanically engaging one end of the corresponding alignment element.

The first substrate of the microchip assembly is disposed above the front surface of the second substrate and the second substrate includes a periphery which extends beyond the first substrate. Preferably, at least one of the depressions of the second substrate is disposed within the periphery of the second substrate.

Another embodiment of the present disclosure includes an apparatus for aligning a first substrate having at least one micro-component disposed thereon relative to a second substrate having at least one micro-component disposed thereon. Each of the substrates includes a front surface oriented in the same direction. The first substrate is disposed between the alignment apparatus and the second substrate and the second substrate includes a periphery which extends beyond the first substrate. At least one depression is disposed on the front surface of the second substrate within the periphery.

The apparatus has a first depression for mechanically engaging one end of a first alignment element which includes an opposite end which engages a depression disposed on the front surface of the first substrate. The apparatus also includes at least one second depression for mechanically engaging one end of a second alignment element. The second alignment element has an opposite end which engages a depression disposed on the front surface of the second substrate. The first and second depressions and the alignment elements cooperate to passively align micro-components disposed on each of the substrates.

Another embodiment of the present disclosure includes an assembly for aligning first and second substrates each having at least one micro-component disposed thereon. Each of the substrates includes a front surface which faces a first direction and opposing side surfaces which face one or more second directions. The assembly includes a first retaining member having a side interface which mechanically engages a corresponding side interface disposed on a first side surface of the first substrate and a bottom depression which cooperates with an alignment element to mechanically engage a corresponding depression disposed on the front surface of the second substrate. The assembly also includes a second retaining member having a side interface which mechanically engages a corresponding side interface disposed on a second side surface of the first substrate and a bottom depression which cooperates with a second alignment element to mechanically engage a corresponding depression disposed on the front surface of the second substrate. The first and second retaining members cooperate to passively align corresponding micro-components disposed on each of the substrates.

Preferably, the side interfaces of the first and second retaining members include angles which mechanically compliment the angles disposed on the first and second side surfaces of the first substrate, each of the angles cooperating to passively align micro-components disposed on each of the substrates.

The present disclosure also relates to a method for mechanically aligning micro-components disposed on first and second substrates. The method includes the steps of: providing first and second substrates each having micro-components disposed thereon and a front surface including at least one depression which faces the same direction; providing an alignment member having:

a first depression for mechanically engaging one end of a first alignment element, the first alignment element including an opposite end which engages a recess disposed on the front surface of the first substrate;

at least one second depression for mechanically engaging one end of a second alignment element, the second alignment element including an opposite end which engages a recess disposed on the front surface of the second substrate;

positioning the first and second substrates in stacked relation relative to one another such that the front surfaces face the same direction; positioning the alignment elements within the recesses disposed within the first and second substrates; and aligning the depressions of the alignment member with the alignment elements such that the periphery of the second substrate extends beyond the first substrate and the micro-components disposed on each of the substrates passively align. Preferably, the micro-components align in direct vertical registry. The method may also include the step of disengaging the alignment member and the alignment elements with the first and second substrates.

Another method according the present disclosure includes the steps of: providing first and second substrates each having a front surface including at least one depression disposed thereon which faces a first direction, the second substrate including a periphery which extends beyond the first substrate; providing an alignment member having a first alignment element for mechanically engaging the depression disposed on the front surface of the first substrate and at least one second alignment element for mechanically engaging the depression disposed on the front surface of the second substrate, positioning the first and second substrates in stacked relation relative to one another such that the front surfaces face the first direction and the periphery of the second substrate extends beyond the first substrate; and mechanically engaging the first alignment element with the depression disposed on the first substrate and mechanically engaging the second alignment element with the depression disposed on the second substrate such that micro-components disposed on each of the substrates are aligned.

A further method according the present disclosure may include the step of: operatively bonding the first substrate and the second substrate by a bonding technique selected from the group consisting of soldering, brazing, applying an adhesives, sol gel glass bonding, eutectic bonding, thermo-compression bonding, ultrasonic bonding or thermo-sonic bonding.

BRIEF DESCRIPTION OF THE DRAWINGS

Various embodiments of the optical connector system of the present disclosure are described below with reference to the drawings wherein.

DETAILED DESCRIPTION

The present disclosure relates to an apparatus and method for aligning micro-components disposed on substrates having patterned surfaces that do not oppose or "face" each other. For the purposes herein the term "micro-component" includes but should not be limited to: "micro-optics, e.g., fiber optic lenses, fiber optic fibers and filaments, fiber optic cables, fiber optic lens arrays, etc.; micro-circuitry, micro-electronics, micro-mechanical systems and devices, micro-electro-mechanical systems and/or other known micro-machined devices and systems. For example, the alignment apparatii described herein can be used to align fiber arrays or a fiber array and a lens array. The present invention can also be used to align, for example, micro-machined substrates for micro-mechanical or micro-optical devices or a substrate to a mechanical transfer (MT) connector ferrule.

Figure 1:
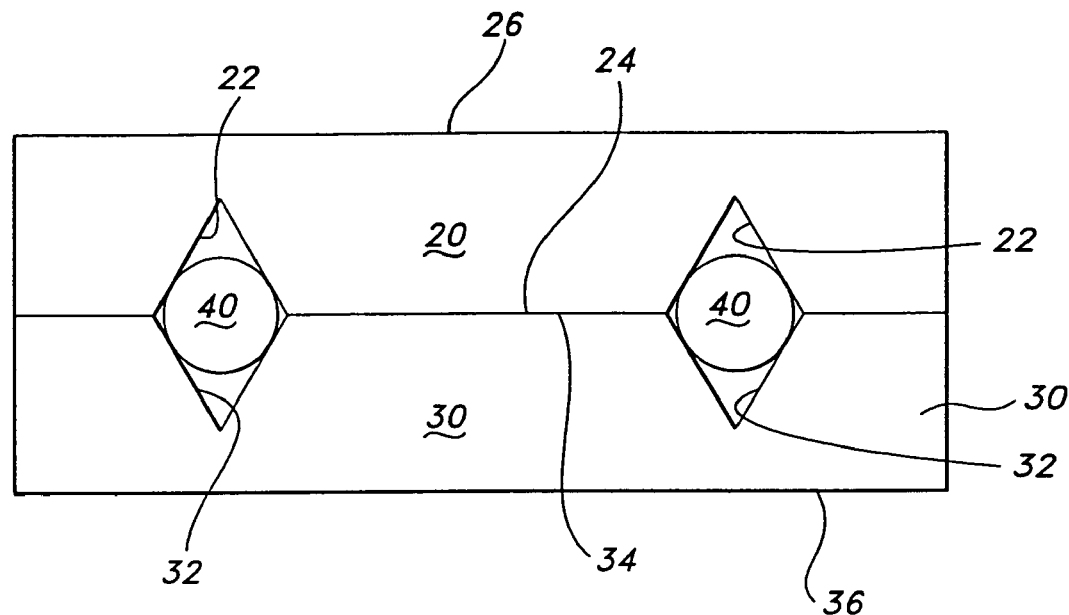
FIG. 1 (Prior Art) is a schematic cross-sectional illustration showing a technique for mechanically aligning two substrates with frontside to frontside features.

Turning now to the drawings, FIG. 1 shows by way of example, a known frontside to frontside technique for aligning substrates 20 and 30. Each substrate 20 and 30 includes a front surface 24, 34 and a rear surface 26, 36, respectively. As can be appreciated, so-called "frontside to frontside" alignment involves aligning substrates 20, 30 with opposing front surfaces, e.g., 24 and 34, which face one another.

With frontside to frontside alignment, one or more alignment elements 40, e.g., ball lenses, cylinders, pins (e.g., so called "short pins"), may be disposed between pits or grooves 22 and 32. The depressions/pits/grooves 22, 32 may be micromachined, e.g., anistropically etched, within each corresponding substrate's 20, 30 surface. The alignment elements 40 cooperate to passively align the substrates 20 and 30 relative to one another for subsequent bonding.

Figure 2:
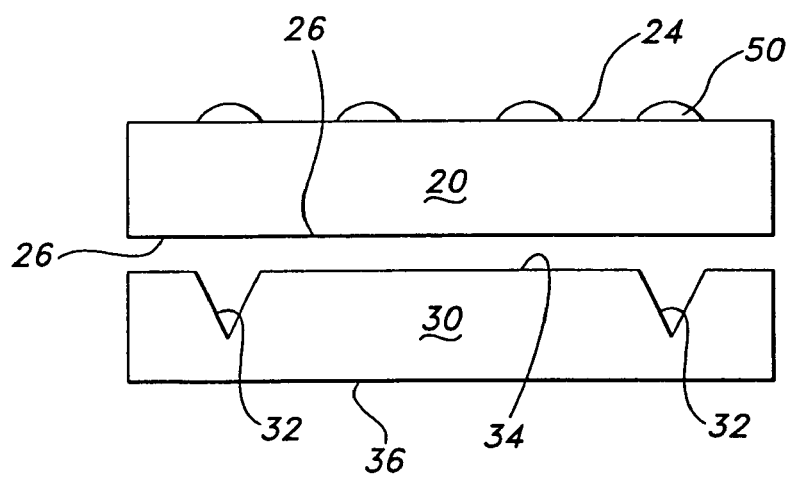
FIG. 2 (Prior Art) is a schematic cross-sectional illustration showing two substrates with frontside to backside features.

FIG. 2 shows "frontside to backside" alignment. Aligning the micro-lenses 50 on substrate 20 with the grooves 32 of substrate 30 without the aid of mechanically engageable surfaces or mechanically alignable components (e.g., alignment elements 40) is more challenging and may result in inaccurate alignment and/or increased processing steps.

Figure 3:
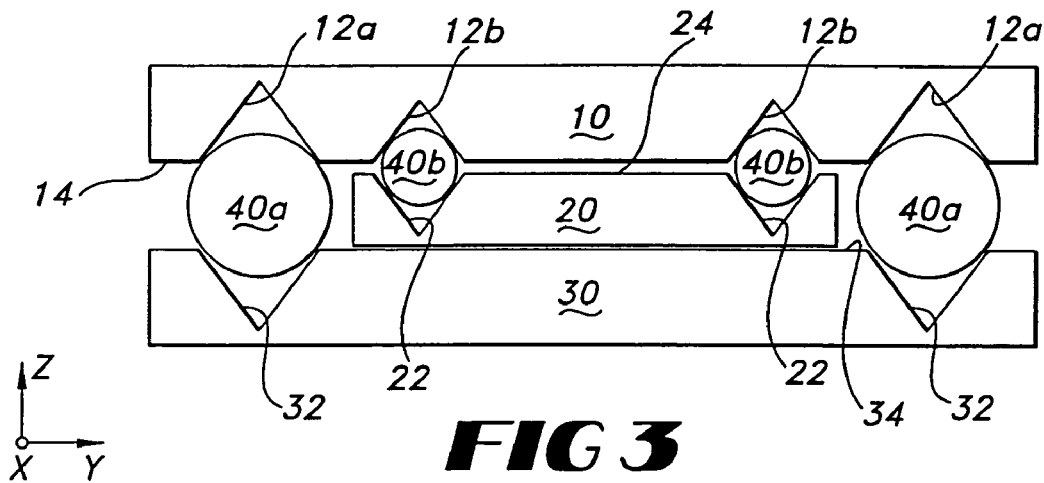
FIG. 3 is a schematic cross-sectional illustration of one embodiment of the alignment apparatus in accordance with the present invention.
Figure 4:
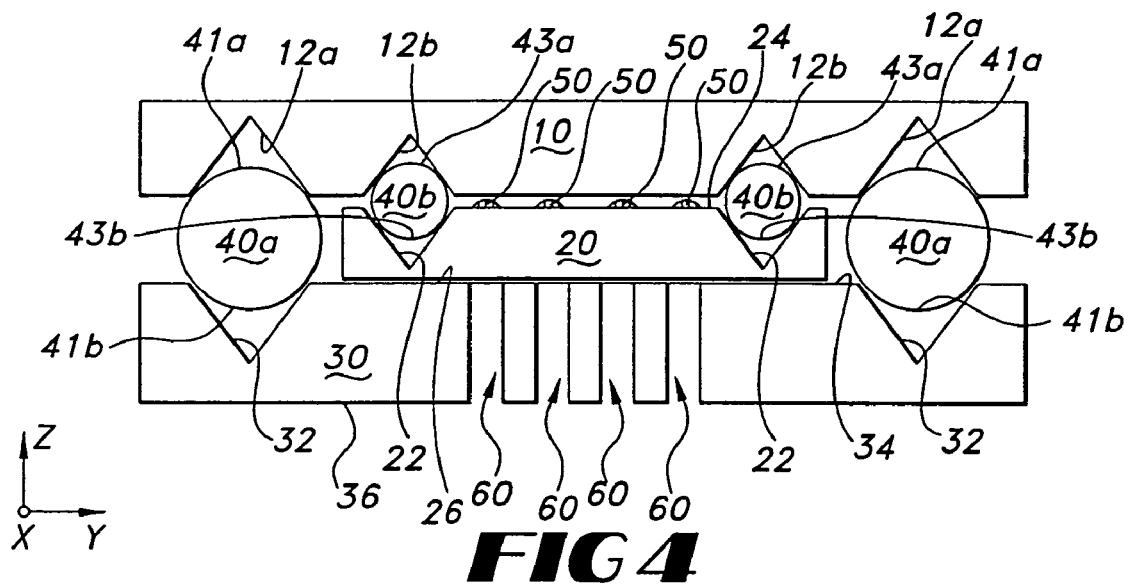
FIG. 4 is a schematic cross-sectional illustration of the alignment apparatus of FIG. 3 shown aligning a series of micro-optic components disposed on two substrates.
Figure 5:
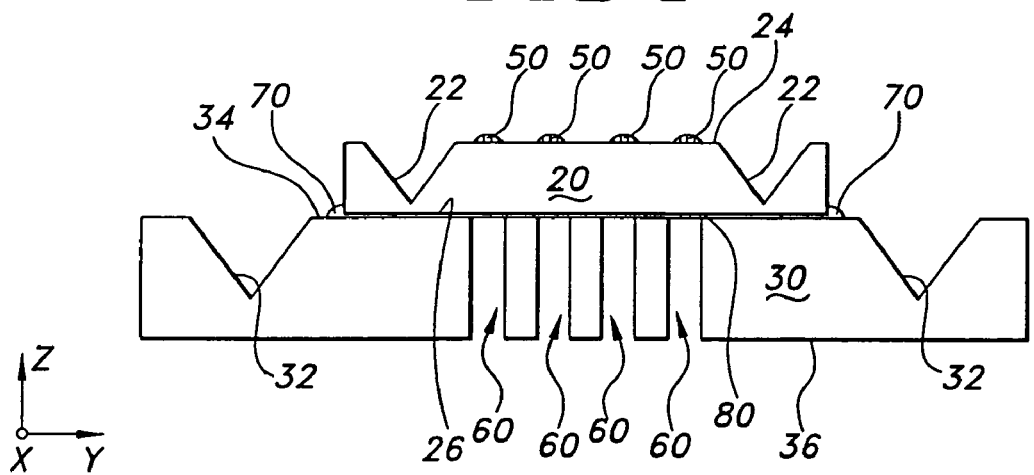
FIG. 5 is a schematic cross-sectional illustration of the two substrates of FIG. 4 shown after bonding and removal of the alignment apparatus.

Turning now to FIGS. 3-5, one embodiment of an alignment apparatus/member 10 is disclosed for use in connection with passively aligning micro-components disclosed on two substrates 20 and 30 which do not include facing surfaces, i.e., frontside to frontside alignment. Alignment member 10 includes a series of depressions 12a and 12b which are dimensioned to cooperate with a corresponding series of depressions 22 and 32 disposed on the front surfaces 24 and 34 of substrates 20 and 30, respectively.

Figure 9:
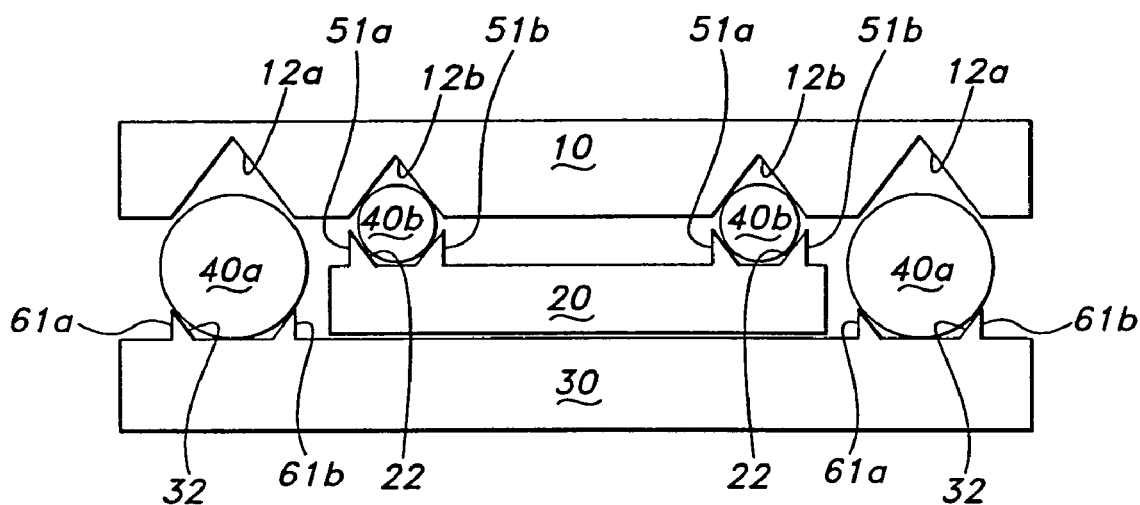
FIG. 9 is a schematic illustration of another embodiment of the present disclosure showing a depression formed between two raised surfaces.

For the purposes herein, the term "depression" may include grooves, pits, sockets, slots, fiducials, channels, apertures, etc. which are typically formed by micro-machining, e.g., anistropically etching, a substrate or by other methods commonly known in the art. It is also contemplated that the depressions 22, 32 may be defined as the area between two raised surfaces 51a, 51b and 61a, 61b, respectively (see FIG. 9).

It is also contemplated that alignment member 10 may include one or more detents or tabs which compliment corresponding depressions disposed on the front surfaces of the two substrates 20, 30 for alignment purposes. In a preferred embodiment, the alignment member 10 cooperates with one or more alignment elements 40, e.g., ball lenses (see FIG. 4). As explained in more detail below, the alignment elements 40 may be dimensioned for partial reception within the associated depressions of the alignment member 10 and/or the depressions of the substrates 20, 30.

Alternatively, one or more alignment elements 40a and 40b may be integrally associated with the alignment member (see FIG. 6H) depending upon a particular purpose. It is also envisioned that the alignment element 40 may be any known shape without departing from the scope of the present invention, e.g., spherical (ball bearings), cube, cylindrical, pyramidal, etc. and combinations thereof.

With particular reference to FIGS. 3-5, the alignment elements 40a and 40b are spherical which are envisioned to provide accurate alignment of substrate 20 with substrate 30. Preferably, the alignment elements 40a and 40b are fabricated from one or more of the following materials: ceramic; silicon nitride; glass silica; alumina; carbides; metals, e.g., steel, titanium; and plastics, e.g., liquid crystal polymers. It is envisioned that a plurality of alignment elements (see FIG. 4) may be utilized in combination with the alignment member 10 in a variety of different configurations to passively align the substrates 20 and 30.

The alignment elements 40a and 40b typically have a diameter ranging from about 0.1 mm to about 3 mm, however, bigger and smaller diameters are also contemplated. It is envisioned that the tolerances of the alignment elements 40a and 40b may vary depending on the material being used. It will be recognized that the diameters of the alignment elements 40a and 40b can be outside the range given above without departing from the spirit or scope of the invention. For precise alignment tolerances, the spheres may have a diameter accurate to about ±1 micron.

As best shown in FIGS. 3-5, alignment member 10 includes a first V-shaped groove 12a which hold/mates with alignment elements 40a. Similarly, substrate 30 includes a V-shaped groove 32 which holds/mates with alignment elements 40a. Alignment member 10 also includes V-shaped grooves 12b which mate with second alignment elements 40b. First substrate 20 also includes V-shaped grooves 22 which mate with an opposite portion of alignment elements 40b.

With reference to the particular embodiment shown in FIGS. 3-5, during assembly, grooves 12a in cooperation with opposite ends 41a and 41b of alignment elements 40a align the second substrate 30 relative to the alignment member 10. Likewise, grooves 12b in cooperation with opposite ends 43a and 43b of alignment elements 40b align the first substrate 20 relative to the alignment member 10. As a result, the two substrates 20, 30 are held in passive alignment relative to one another. It is also envisioned that the first substrate 20 may include one or more holes (not shown) disposed therethrough which accommodate the alignment elements 40a for aligning the second substrate 30.

As can be appreciated, grooves 12a and 12b, and grooves, 22, 32 of each corresponding substrate 20, 30 are configured, positioned and dimensioned such that when the two substrates 20 and 30 are superimposed atop one another, i.e., "stacked", the grooves 12a, 12b, 22 and 32 (and/or the grooves 12a, 12b, 22 and 32 in collaboration with one or more alignment spheres 40a, 40b) cooperate to passively align the micro-components disposed on each substrate 20 and 30. More particularly, as the alignment elements 40a, 40b engage grooves 12a, 32 and 12b, 22, respectively, the grooves "seat" each sphere 40a, 40b an accurate distance relative to each substrate 20, 30. Preferably, the alignment member 10 and the alignment elements 40a, 40b are designed such that as each alignment element 40a, 40b mates within a respective groove and the two substrates 20, 30 passively align with respect to one another.

As can be appreciated, the alignment elements 40a, 40b may be horizontal cylinders which kinematically mount the first and second substrates and prevent undesirable movement (translations and/or rotation) relative to the "xy" plane.

As best illustrated in FIGS. 4 and 5, passively aligning the two substrates 20, 30 relative to one another aligns the micro-components associated with the first substrate 20, e.g., micro-lenslets 50, with the micro-components associated with the second substrate 30, e.g., micro-channels 60. Preferably, the micro-components 50 and 60 align in direct vertical registry with one another as illustrated in FIG. 5.

Optical fibers (not shown) can be inserted into the channels 60. Fibers in the channels 60 will be accurately aligned with respect to the lens 50. By utilizing alignment member 10 and/or alignment member 10 in combination with one or more alignment spheres, e.g., 40a, 40b, a more accurate alignment results. It is envisioned that passive alignment the micro-components in this manner will effectively reduce alignment error of the optical fibers and lenslets.

Substrates 20 and 30 as well as alignment member 10 may be manufactured from any suitable material capable of being processed to form the requisite mechanical interfaces or patterns therein. Suitable materials include but are not limited to, silicon, GaAs, metals, plastic materials such as, for example, a high-performance engineering plastics, and the like. For example, the depressions disclosed herein may be formed employing well known etching techniques, e.g., anisotropic etching of silicon utilizing a conventional anisotropic etchant such as KOH or EDP. In this manner, the depth and width of the depressions 12a, 12b, 22 and 32 can be accurately controlled with great precision. This, in turn, enables the two substrates 20 and 30 to be passively aligned with a high degree of accuracy.

Once the micro-components are properly aligned, the two substrates 20, 30 may be bonded known bonding techniques, e.g., soldering; brazing; adhesives, e.g., epoxies or other monomeric or polymeric adhesives, sol gel glass; eutectic bonding; thermo-compression bonding; thermo-sonic bonding and other attachment technologies well known to those of ordinary skill in the art. Once the two substrates 20, 30 are properly bonded, the alignment member 10 and the alignment elements 40a and 40b can be removed. In fact, the alignment elements 40a and 40b may be permanently joined or integrally associated with the alignment member 10 (see FIG. 6H).

FIGS. 3-5 illustrate alignment of substrates 20 and 30 utilizing one alignment member 10 in cooperation with multiple alignment elements 40a and 40b. As mentioned above, the alignment member 10 may include tabs or detents which mechanically engage the substrates 20 and 30 without utilizing one or more alignment elements 40a and 40b. Moreover and as best shown in FIGS. 6A-6G, the alignment member 10 may include other types of mechanical interfaces which engage the substrates 20, 30 which vary in geometric configuration depending upon a particular purpose.

Figure 6A:
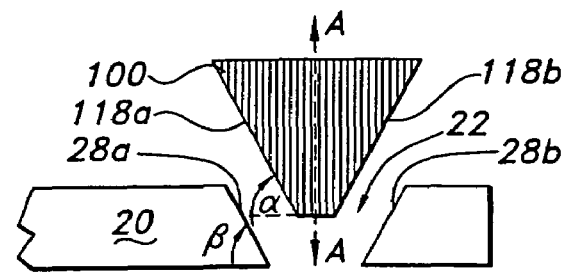
FIGS. 6A-6C are schematic cross-sectional illustrations of an alternate embodiment of the alignment apparatus according to the present invention shown engaging complimentary and non-complimentary interfaces associated with a first substrate.
Figure 6B:
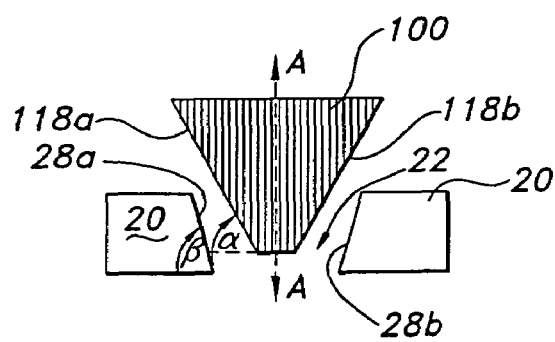
Figure 6C:
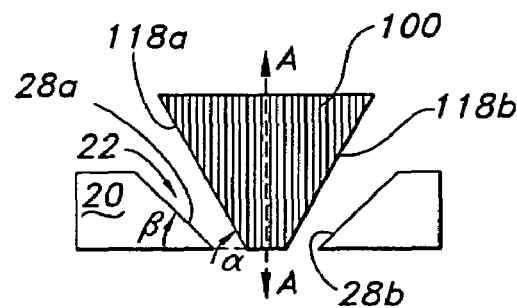

FIG. 6A illustrates an alternate embodiment of the alignment member 100 shown prior to mechanical engagement with the first substrate 20. Alignment member 100 is generally pyramidal in shape and includes a pair of side surfaces 118a and 118b which converge inwardly at an angle alpha "α" relative to axis "A" defined through the alignment member 100. As can be appreciated, side surfaces 118a and 118b are preferably angled to mate with a corresponding groove 22 disposed within first substrate 20.

The corresponding groove 22 includes an inner periphery having opposing sides 28a and 28b which diverge from axis "A" at an angle beta "β" to mechanically engage the pyramidally-shaped alignment member 100 in a "wedge-like manner" within the groove 22. It is envisioned that the angle beta "β" may be dimensioned greater than the angle alpha "α" (See, e.g., FIG. 6B), less than the angle alpha "α" (See, e.g., FIG. 6C) or equal to the angle alpha "α" (See FIG. 6A). In each instance, the pyramidally-shaped alignment member 10 is designed to wedge within the groove 22. Preferably, the angle of "α" and "β" are equal and are within a range of about 20-70 degrees and, more preferably, within a range of about 30 to 60 degrees. In one embodiment, the angle of "α" and "β" is 54.7 degrees which is the case with anisotropically etched silicon.

Figure 6D:
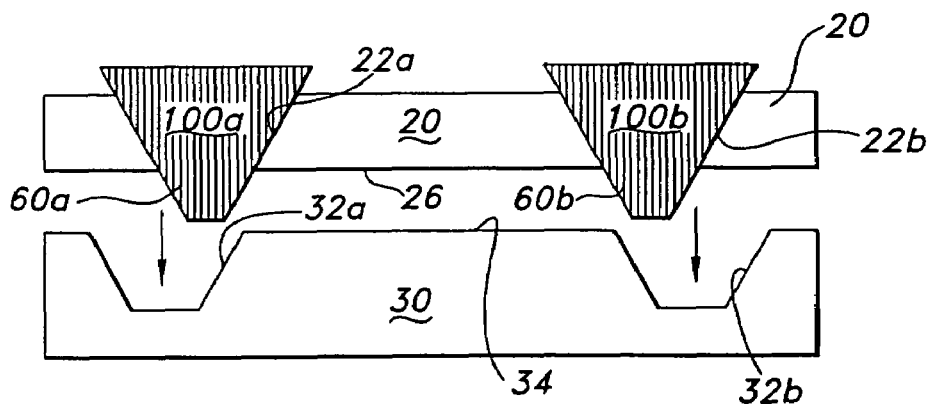
FIGS. 6D and 6E are schematic illustrations showing two alignment apparatii cooperating to align two substrates.
Figure 6E:
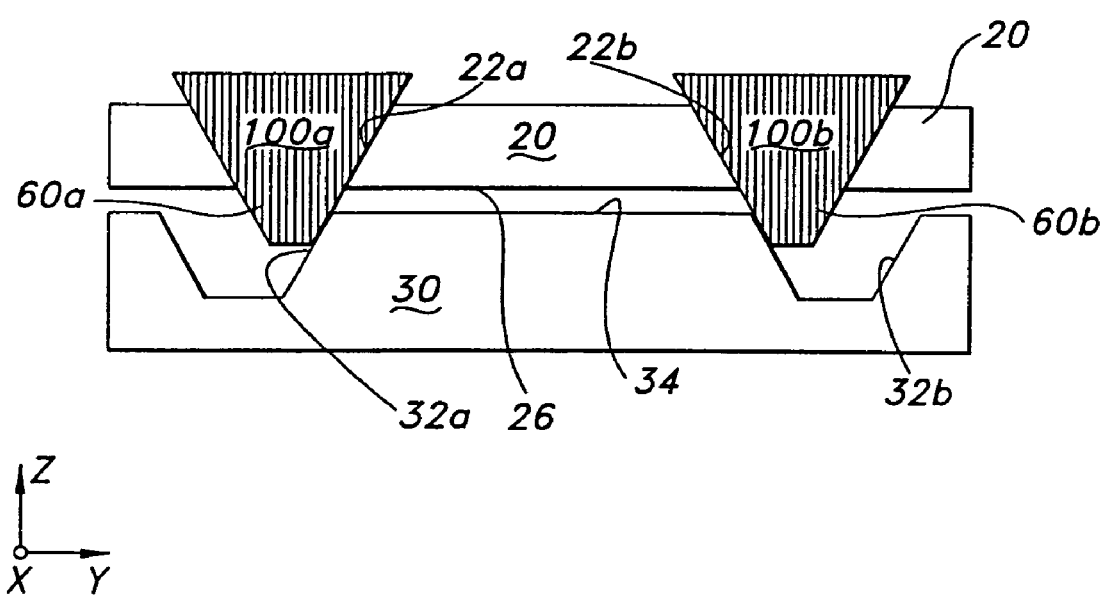

FIGS. 6D and 6E show two alignment members 100a and 100b secured within grooves 22a and 22b, respectively. It is envisioned that each pyramidal-shaped alignment member 100a, 100b includes an apex 60a, 60b, respectively, which partially projects beyond a back surface 26 of the first substrate 20 to mechanically engage a corresponding interface 32a, 32b. Each alignment member 100a and 100b is wedged within a corresponding groove 22a and 22b disposed within substrate 20 such that the two alignment members 100a and 100b cooperate to passively align substrate 20 with substrate 30. Each alignment member 100a and 100b at least partially engages a corresponding groove 32a and 32b, to align the two substrates 20, 30 relative to one another. As mentioned above, the grooves associated with each substrate 20, 30 and the dimensions of the pyramidal-shaped alignment members 100a and 100b may be manufactured with a relatively high degree of accuracy which, in turn, aligns the two substrates 20, 30 and the respective micro-components disposed thereon, to a high degree of accuracy.

Figure 6F:
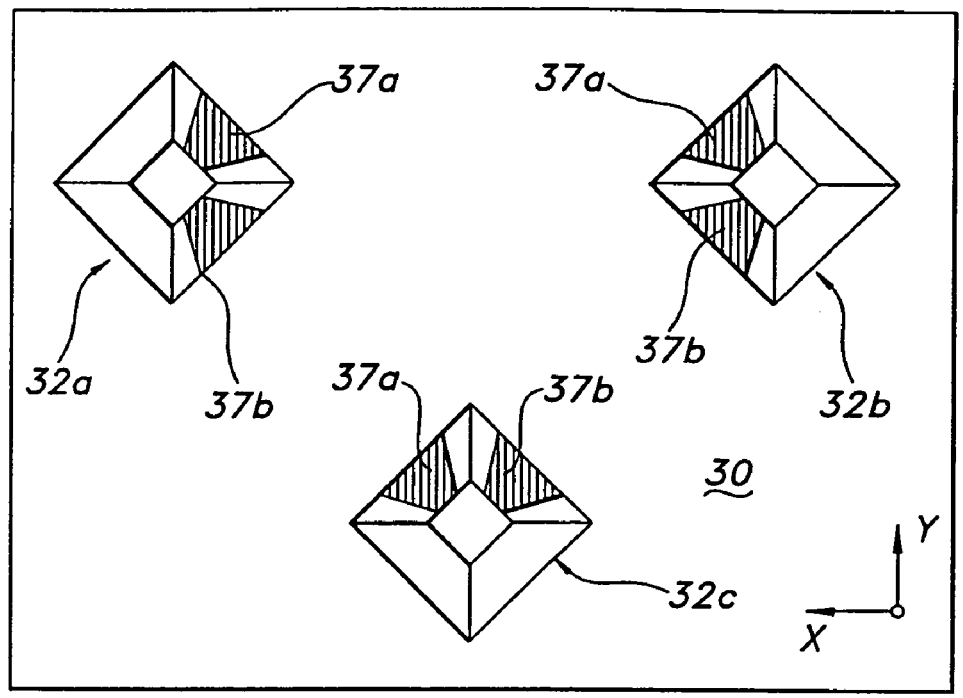
FIGS. 6F and 6H are top, schematic illustrations of a second substrate having a plurality of interfaces disposed thereon for inter-engagement with corresponding alignment apparatii according to the present disclosure and highlighting possible contacting surfaces of the alignment apparatii.

As best shown in FIGS. 6E and 6F, three alignment members may cooperate to align the substrates 20, 30 relative to one another along multiple axes (x, y, z) or between multiple planes (xy, xz, yz). More particularly, three (3) alignment members 100 may be dimensioned to mechanically engage first substrate 20 such that each alignment member 100 partially "mates" or "seats" within a corresponding groove 32a, 32b and 32c associated with the substrate 30. Accurate passive alignment of the substrates 20 and 30 in directions "x" and "y" (or the "xy" plane) may be achieved through the cooperation among the three alignment members 100 as each alignment member 100 seats within its respective groove 32a, 32b and 32c. As can be appreciated, this kinematically mounts the first and second substrates 20, 30 and prevents undesirable movement (translations and/or rotation) relative to the "xy" plane.

Figure 6G:
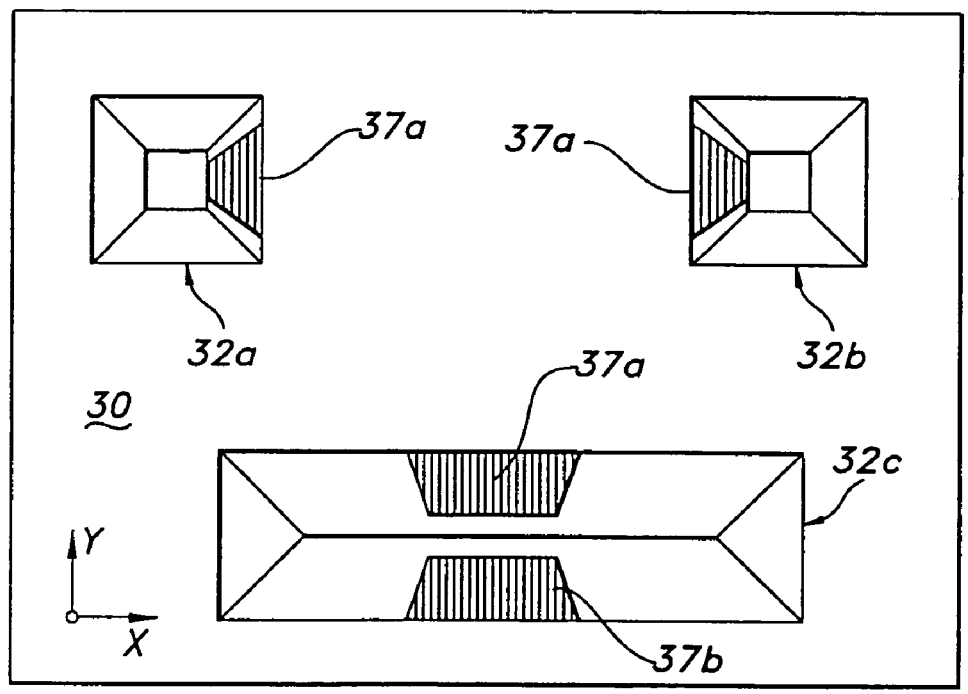

It is noted that accurate alignment of the substrates 20 and 30 relative to one another may be successful upon partial seating of the alignment members within one or more grooves 32a, 32b and/or 32c. For example, FIG. 6F shows the surfaces of contact 37a and 37b associated with aligning two substrates 20 and 30 with three (3) alignment members 100 within the "xy" plane. FIG. 6G shows the relevant contact surfaces 37a and 37b associated with aligning two substrates 20 and 30 with three (3) alignment members 100 within the "xy" plane wherein substrate 30 includes an elongated V-shaped groove 32c.

Figure 6H:
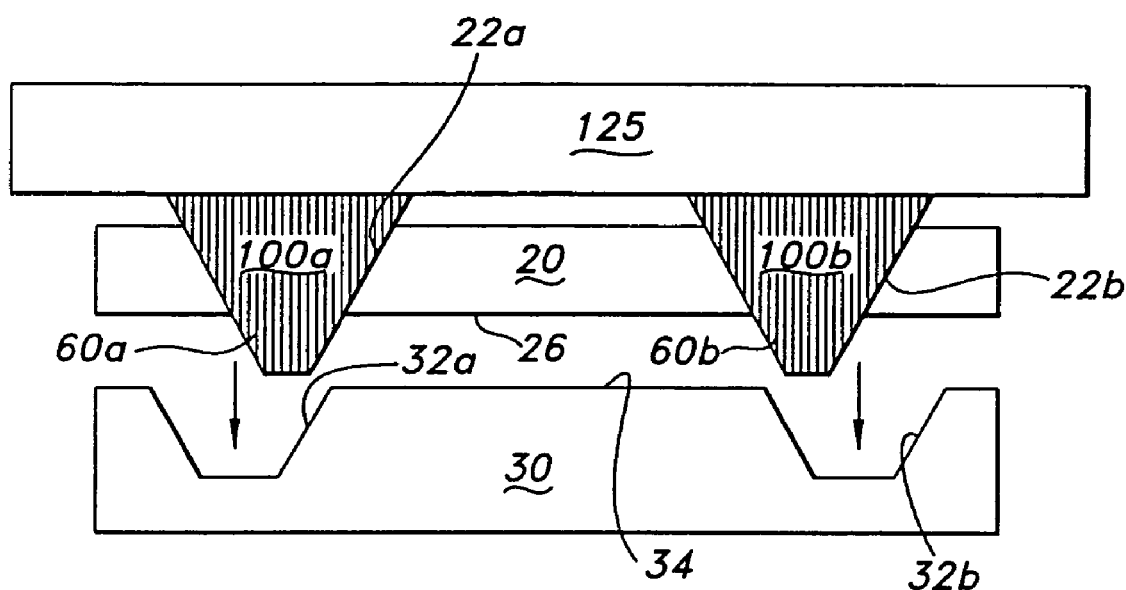

FIG. 6H shows yet another embodiment of the alignment member of FIGS. 6A-6D wherein the apexes 60a and 60b project from a pyramid substrate 125. The apexes are formed by anisotropic etching of silicon utilizing a conventional anisotropic etchant such as KOH or EDP. Each apex 60a, 60b is dimensioned to seat within a corresponding groove 22a, 2b of the first substrate 20 such that the each apex 60a, 60b partially projects beyond a back surface 26 of the first substrate 20 to mechanically engage interface 32a, 32b. As mentioned above, pyramidal-shaped substrate 25 may be manufactured with a relatively high degree of accuracy which, in turn, aligns the two substrates 20, 30 and the respective micro-components disposed thereon to a high degree of accuracy.

Figure 7A:
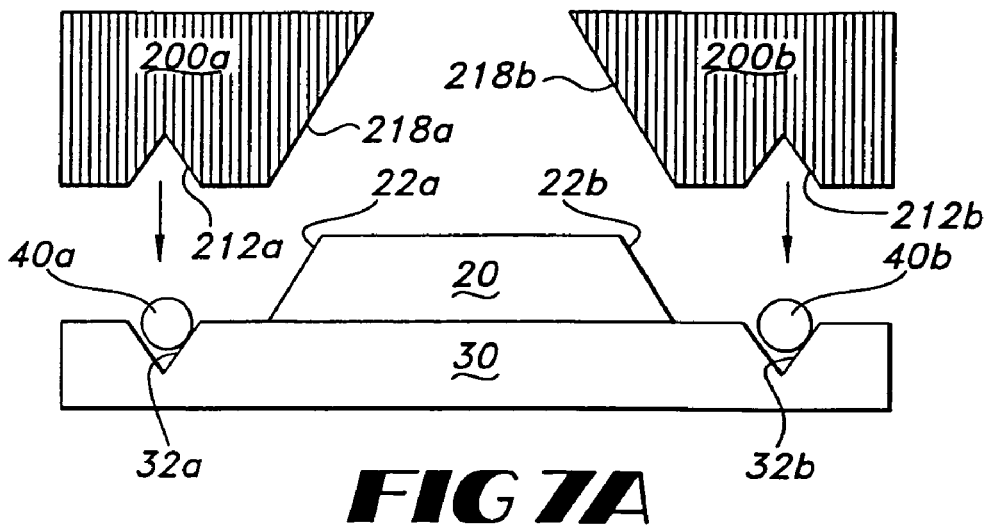
FIGS. 7A-7C are schematic, cross-sectional illustrations of an alternate embodiment of the alignment apparatus according to the present invention.
Figure 7B:
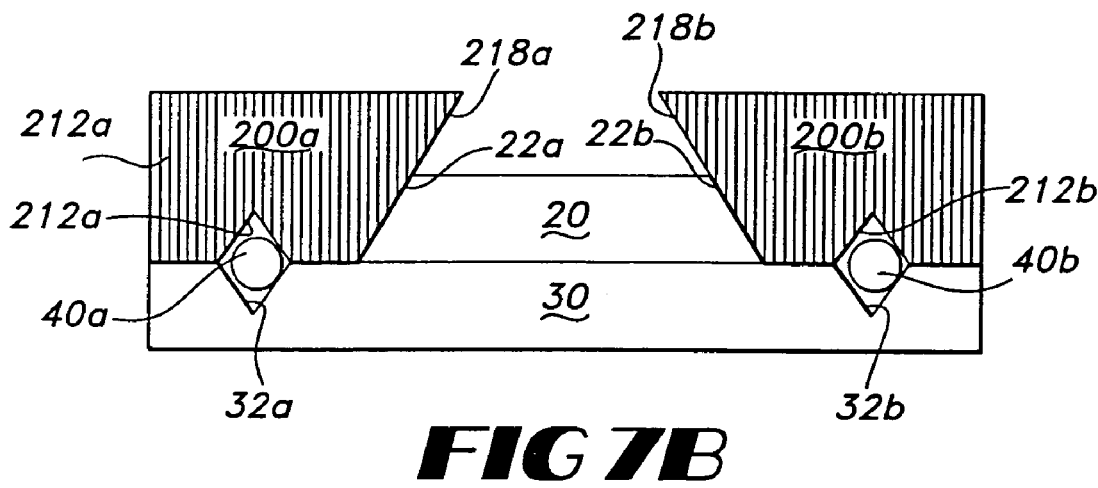
Figure 7C:
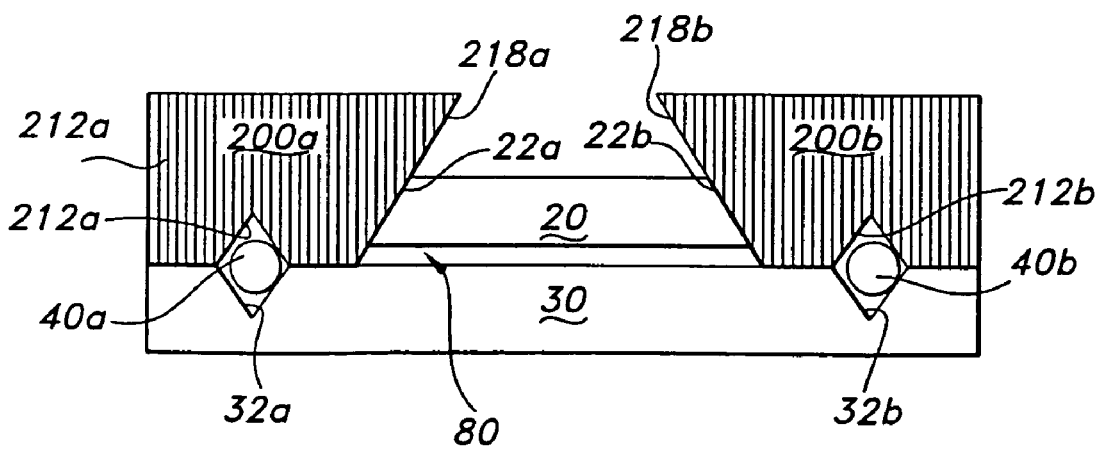

FIGS. 7A-7C show another alternate embodiment of an alignment member 200 according to the present disclosure. More particularly, a pair of alignment members 200a and 200b each having a depression 212a, 212b and an additional mechanically engagable surface 218a, 218b, respectively, cooperate to align substrate 20 with respect to substrate 30. Depressions 212a and 212b operate in a similar fashion as the mechanical interfaces 12a shown with respect to alignment member 10 (shown in FIGS. 3-5) and mechanically engagable surfaces 218a and 218b operate in a similar fashion as the side surfaces 118a and 118b shown with respect to alignment member 100 (shown in FIGS. 6A-6E). Each alignment member 200a, 200b includes a first depression 212a, 212b, respectively, which engages an alignment sphere 40a, 40b, respectively. The spheres are, in turn, engaged within a corresponding depression 32a, 32b, respectively, disposed within substrate 30.

Substrate 20 aligns with alignment member 200a and 200b by engagement of surfaces 218a, 218b with corresponding surfaces 22a and 22b, respectively. More particularly, the alignment members 200a and 200b include inwardly opposing surfaces 218a and 218b having angles which mechanically compliment the outer angular surfaces 22a and 22b of substrate 20 such that substrate 20 "wedges" between the alignment members 200a and 200b.

FIG. 7B shows the alignment members 200a and 200b retaining substrate 20 in close abutment with respect to substrate 30 and FIG. 7C shows alignment members 200a and 200b retaining substrate 20 relative to substrate 30 thereby creating a gap 80 therebetween. Depressions 212a, 212b and surfaces 218a, 218b cooperate to passively and accurately align the two substrates 20 and 30 with minimal alignment error between micro-components.

As can be appreciated, the thickness of the substrates 20, 30 and the thickness of the alignment member 10 do not effect alignment of the micro-components 50, 60. More particularly, it is known that the thickness of a substrate may vary as much as 5 to 10 microns which can pose significant problems with alignment using other conventional methods of alignment. The present invention and the alignment techniques disclosed herein provide accurate and precise alignment of the micro-components irrespective of the thickness variations among substrates.

The present disclosure also relates to a method for mechanically aligning micro-components disposed on first and second substrates. The method includes the steps of: providing first and second substrates 20 and 30 each having a front surface 24, 34 including an interface 22, 32 disposed thereon; providing an alignment member 10 having a first interface 12*b* which is dimensioned to engage interface 22 disposed on the first substrate 20 and a second interface 12*a* which is dimensioned to engage interface 32 disposed on the second substrate 30; positioning the first and second substrates 20, 30 in stacked relation relative to one another such that the front surfaces 24, 34 face the same direction; and engaging the first interface 12*b* with interface 22 and engaging the second interface 12*a* with interface 32 such that corresponding micro-components disposed on each of the substrates 20, 30 are aligned.

A further method includes the step of: bonding the first substrate 20 and the second substrate 30 by a bonding technique selected from the group consisting of: soldering, brazing, applying an adhesives, sol gel glass bonding, eutectic bonding, thermo-compression bonding, or thermo-sonic bonding.

A further method includes the step of: interposing an alignment elements 40*a*, 40*b*) between the mechanical interfaces 12*a*, 12*b* of the alignment member 10 and the corresponding mechanical interface 22, 32 of the substrates 20, 30, to passively align the two substrates 20 and 30 relative to one another.

Figure 8A:
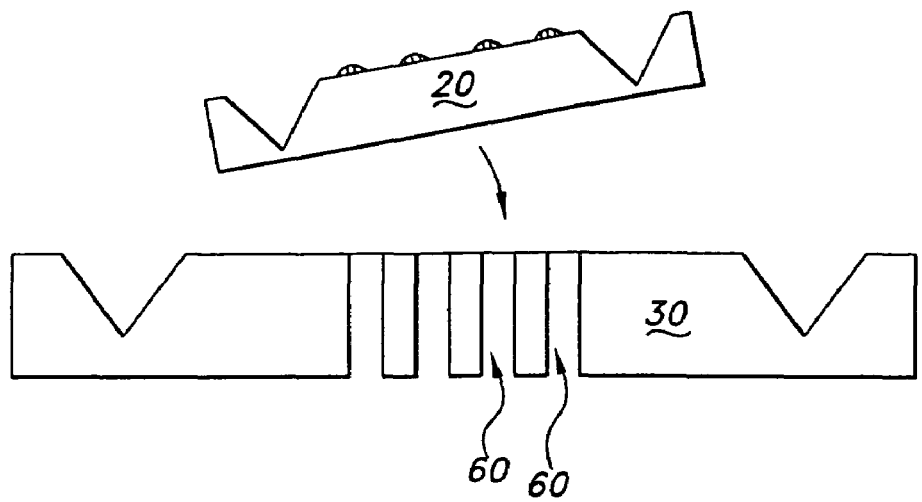
FIGS. 8A-8E are schematic illustrations showing the step-by-step alignment method according to the present disclosure.
Figure 8B:
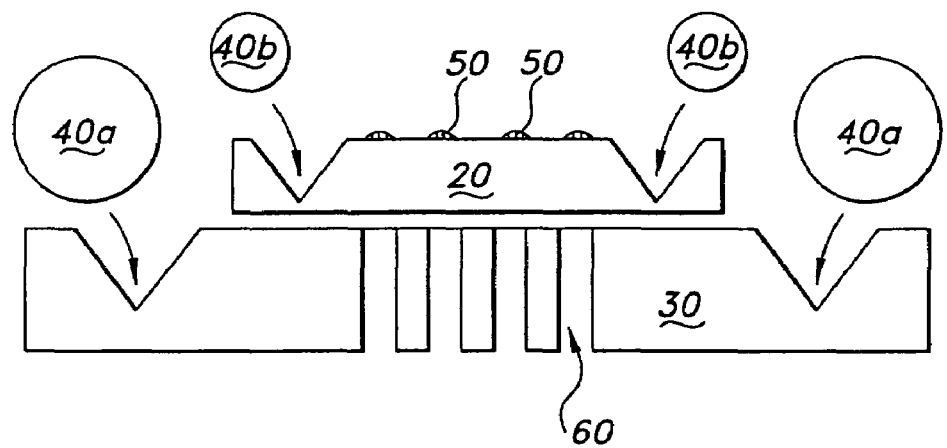
Figure 8C:
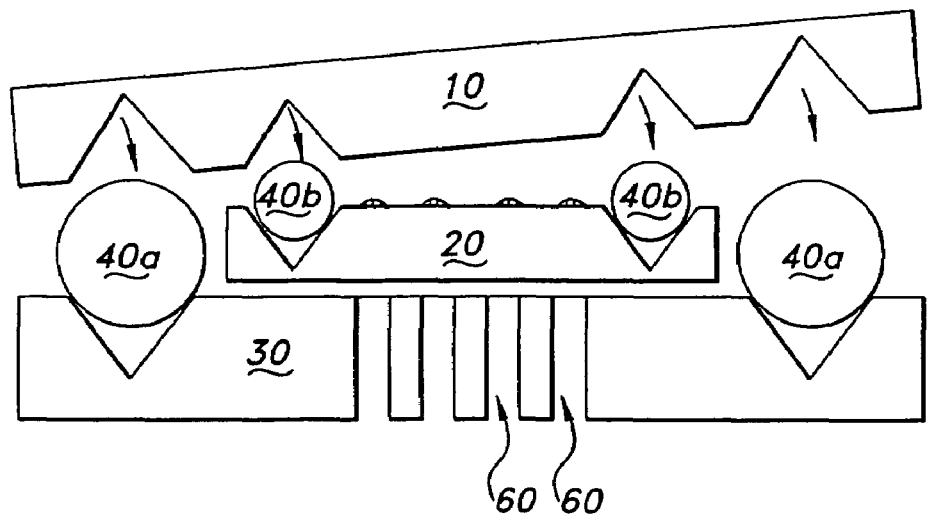
Figure 8D:
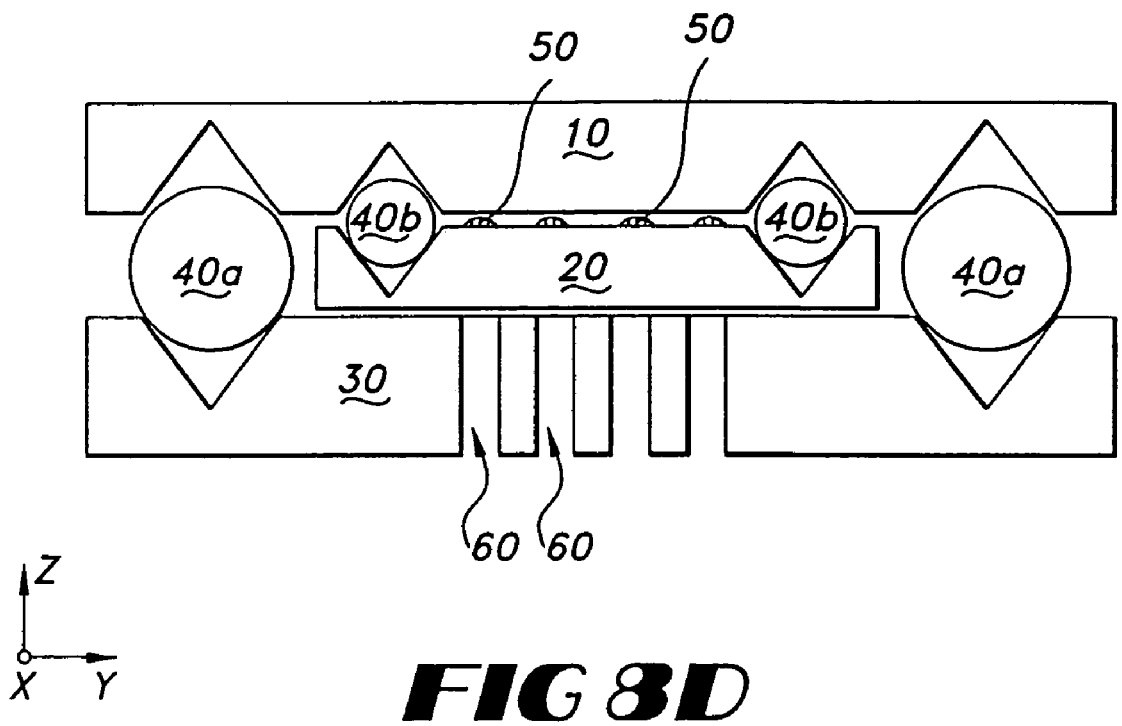

Another method according to the present disclosure includes the steps of: providing first and second substrates 20, 30 each having micro-components 50, 60, respectively, disposed thereon and a front surface 24, 34 having at least one depression 22, 32 which faces the same direction; providing an alignment member 10 having:

a first depression 12*b* being dimensioned to mechanically engage one end 43*a* of a first alignment element 40*b*, the first alignment element 40*b* including an opposite end 43*b* which engages a recess 22 disposed on the front surface 24 of the first substrate (20);

at least one second depression 12*a* being dimensioned to mechanically engage one end 41*a* of a second alignment element 40*a*, the second alignment element 40*a* including an opposite end 41*b* which engages a recess 32 disposed on the front surface 34 of the second substrate 30;

positioning the first and second substrates 20, 30 in stacked relation relative to one another such that the front surfaces 24, 34 face the same direction (see FIG. 8A);

positioning the alignment elements 40*a*, 40*b* within the recesses 22, 32, respectively, disposed within the first and second substrates 20, 30 (see FIG. 8B); and aligning the depressions 12*a*, 12*b* of the alignment member 10 with the alignment elements 40*a*, 40*b* such that the periphery of the second substrate 30 extends beyond the periphery of the first substrate 20 and the micro-components 50, 60 disposed on each of the substrates 20, 30 passively align (see FIGS. 8C and 8D).

For the purposes herein, the term "periphery" may include the outermost perimeter of the substrates 20, 30 or the innermost perimeter of the substrates 20, 30 which typically include edges or borders. For example, it is envisioned that the first substrate 20 may include a large hole and the periphery of the second substrate 30 extends beyond the periphery (i.e., extends beyond the large hole) in the first substrate 20.

Figure 8E:
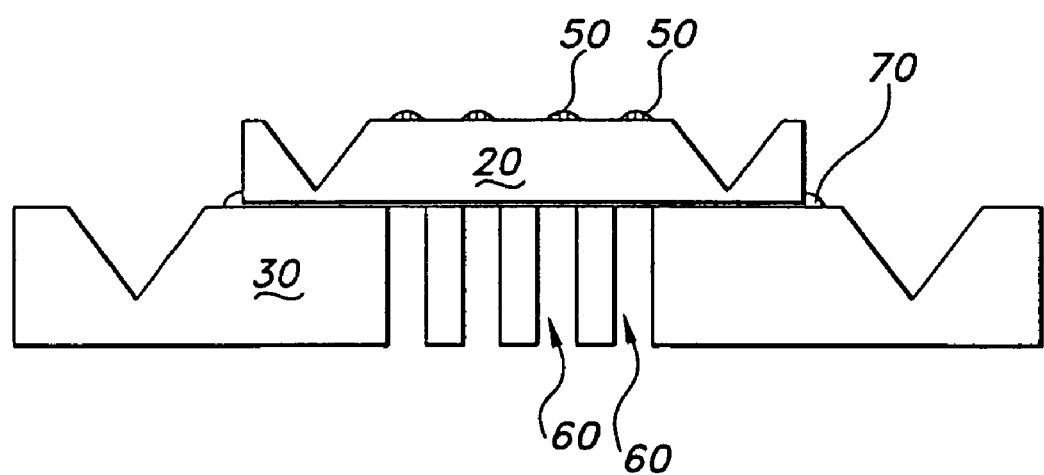

A further step according to the present disclosure includes bonding the two substrates 20, 30 in alignment with a bonding agent, solder or adhesive (see FIG. 8E. Preferably, the micro-components 50, 60 align in direct vertical registry with one another.

From the foregoing and with reference to the various figure drawings, those skilled in the art will appreciate that certain modifications can also be made to the present disclosure without departing from the scope of the same. Further and although several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of preferred embodiments. Those skilled in the art will envision other modifications within the scope and spirit of the claims appended hereto.

What is claimed is:

1. An apparatus for aligning a first substrate relative to a second substrate wherein the first substrate includes a front surface, a rear surface and at least one micro-component disposed on the front surface and the second substrate includes a front surface, a rear surface and at least one micro-component disposed on the front surface and wherein the front surfaces of the first and second substrates are oriented in the same direction, the apparatus comprising:

a pyramidally-shaped alignment member having a pair of side surfaces and an apex mechanically receivable within a recess disposed in said front surface of the first substrate;

said apex configured to partially project through the rear surface of said first substrate to mechanically engage a recess disposed on the front surface of the second substrate; and said side surfaces and said apex cooperating to passively align the micro-components disposed on each of said substrates.

2. An assembly for aligning first and second substrates each having at least one micro-component disposed thereon, each of said substrates including a front surface which faces a first direction and opposing side surfaces which face one or more second directions, said assembly comprising:

a first retaining member having a side interface which mechanically engages a corresponding side interface disposed on a first side surface of the first substrate and a bottom depression which cooperates with an alignment element to mechanically engage a corresponding depression disposed on the front surface of the second substrate;

a second retaining member having a side interface which mechanically engages a corresponding side interface disposed on a second side surface of the first substrate and a bottom depression which cooperates with a second alignment element to mechanically engage a corresponding depression disposed on the front surface of the second substrate, said first and second retaining members cooperating to passively align corresponding micro-components disposed on each of the substrates.

3. An assembly according to claim 2 wherein said side interfaces of the first and second retaining members include angles which mechanically compliment the angles disposed on said first and second side surfaces of the first substrate, each of said angles cooperating to passively align micro-components disposed on each of the substrates.

* * * * *